Sept. 18, 1934.  W. SHURTLEFF  1,973,729
HUMIDIFYING APPARATUS
Filed June 15, 1931   2 Sheets-Sheet 1

Inventor:
Wilfred Shurtleff
By: George I. Haight Atty.

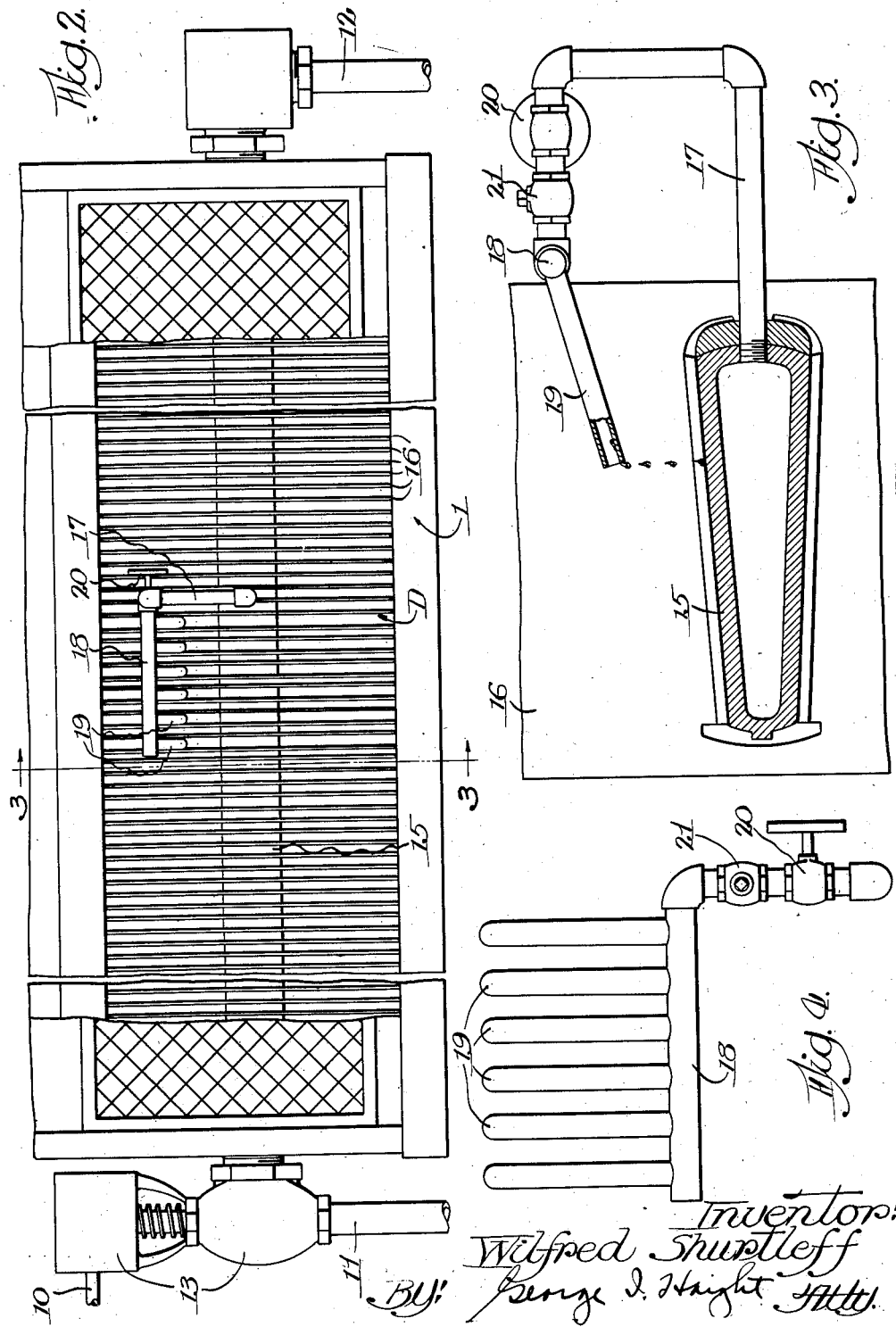

Patented Sept. 18, 1934

1,973,729

UNITED STATES PATENT OFFICE 1,973,729

HUMIDIFYING APPARATUS

Wilfred Shurtleff, Moline, Ill., assignor to The Herman Nelson Corporation, Moline, Ill., a corporation of Illinois Application June 15, 1931, Serial No. 544,453

2 Claims. (Cl. 237—78)

My invention relates to an improved system of humidity control for artificially heated rooms.

It is generally known that the relative humidity and temperature in an occupied room bear a definite relation to each other in this respect that a given temperature requires a certain degree of relative humidity, and that as the temperature varies the relative humidity should correspondingly varied to maintain a condition compatible with human comfort. Based on the general knowledge of this relation, it is the common practice to provide means for supplying artificial heat and a separate independent means to supply moisture to the atmosphere, and to attempt to regulate these means by devices which are responsive to the temperature and humidity condition, and which, so far as their sensitivity to conditions is concerned, are separate and independent of each other. The usual system of temperature regulation, involving a thermostat and radiator valves controlled thereby, is comparatively simple, accurate and reliable in operation. The various systems involving humidostats and instrumentalities controlled thereby for introducing moisture to the atmosphere, are complicated, fragile and delicate, subject to deterioration, and generally fail to remain in accurate, dependable, operative condition for any length of time, thereby requiring repeated expert servicing to maintain them in practical operation. They are, furthermore, slow acting and, from a practical standpoint, incapable of maintaining moisture conditions in the required relation to temperature.

It is not generally known, however, that the requirement for artificial humidity is in a direct proportion to the amount of artificial heat required to maintain the proper room temperature. To illustrate, when the outside temperature is such that no artificial heat is required inside, the natural moisture content of the air is proper for comfort. When, however, the outside temperature is lower than inside, and artificial heat is required within the room, the percentage of moisture in the inside atmosphere must be increased proportionately, the reason for this increase being due to the fact that as artificial heat is added to the inside air the expansion of the air reduces the percentage of moisture content per cubic foot and it becomes necessary then to add sufficient moisture to bring up the relative humidity to the degree required. This change in moisture percentage varies in a direct proportion to the amount of artificial heat necessary to maintain the desired inside temperature in accordance with the variations of outside temperature.

Based on the fact that the moisture requirements follow a definite proportional relation to the requirements for artificial heat, I propose a system of humidity control in which humidostats or similar devices, sensitive to humidity conditions in the room, are entirely eliminated, together with the humidifying devices generally associated with and controlled by the humidostat. Instead, I propose to associate air-moistening means with the air-heating means in such manner that the amount of moisture added to the air is a function of the heat added so that the relative humidity of the heated and moistened air stays within certain limits which are regarded as necessary for human comfort. Thus the temperature and humidity will be controlled by a thermostat.

This is accomplished by associating with the heating means, such as the radiator, a moistening device which releases into the atmosphere a portion of the steam, which is circulated in the radiator. The amount of steam thus released is a function of the amount of heat given up by the steam which is circulated in the radiator.

One embodiment of the invention is illustrated in the accompanying drawings, in which Fig. 1 illustrates a portion of a typical room, showing a unit heating means therefor and air-moistening means associated therewith under the control of a thermostat;

Fig. 2 is an enlarged elevation of the lower portion of the heating unit shown in Fig. 1, a portion of the air inlet grill of the cabinet being broken away to show the radiator and the air-moistening device associated therewith;

Fig. 3 is a partial enlarged detail section on the line 3—3 of Fig. 2; and

Fig. 4 is a plan view of part of the air-moistening device illustrated in Figs. 2 and 3.

Figure 1:
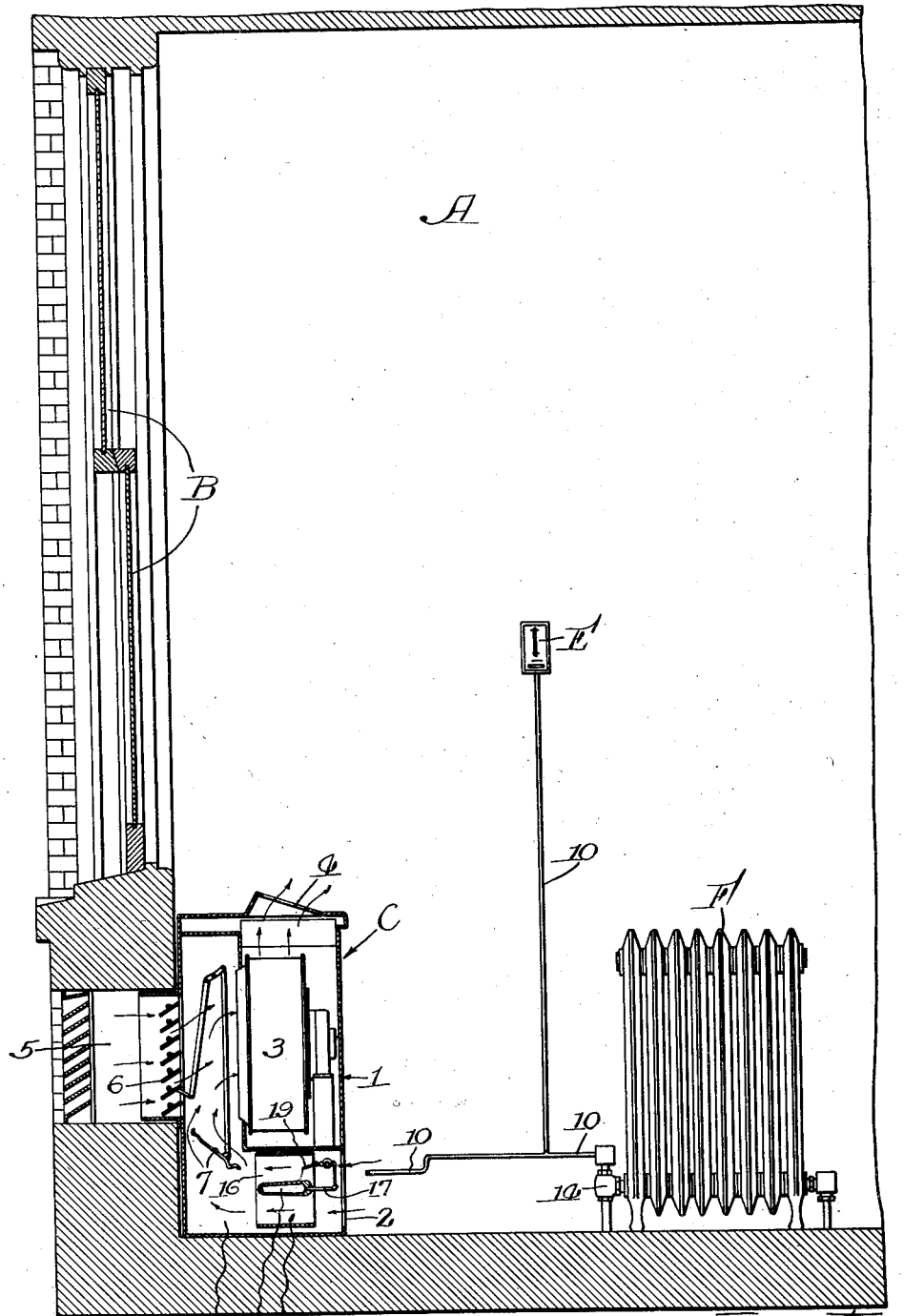

The invention is illustrated in association with a unit heating device preferably because unit heating devices of this character contain fans by means of which the air is circulated to bring about quicker and more uniform distribution of heat and moisture within the room.

The room A is typical of any room, such as a school room, having the usual wall structure and windows B. A unit heating device C is positioned in the room beneath the windows for heating and circulating air in accordance with the temperature requirements. This unit heating device comprises a cabinet 1 having an air inlet opening 2 at its bottom communicating with the room through which air from the room is drawn into the cabinet by means of a fan 3 and discharged into the room through a discharge outlet or opening 4 at the top of the cabinet. At its rear, the cabinet also has an air intake 5 extending to the outside through the wall of the building and through which outside air is drawn by the fan into the cabinet and discharged into the room through the discharge outlet 4.

A series of interconnected dampers 6 and 7 control the admission of air to the cabinet through the outside air inlet 5 and through the inside re-circulating air inlet 2. The damper 7 controls the admission of inside air to the cabinet and the damper 6 controls the admission of outside air through the intake 5. A heating radiator D is positioned in the inlet chamber 8 in the lower portion of the cabinet for the purpose of heating only the inside air which is drawn through the inlet 2 and the radiator D. A thermostat E, positioned on the wall, is adapted to control the amount of heating fluid, such as steam, which is circulated through the radiator D.

The thermostat and radiator control system associated therewith may be of any standard or desired type. That which is shown is connected by piping 10 which extends to the radiator valve 13 in which varying air pressures are effective to operate the radiator valves and govern the flow of steam through the radiators in a well-known manner.

The structure shown in Fig. 2 illustrates a steam supply pipe 11 connected to one end of the radiator D and a steam outlet pipe 12 connected to the opposite end of the radiator. The pressure-operated valve 13 is connected in the supply pipe to the radiator and is effective to open or close the radiator or vary the amount of steam to the radiator in accordance with the control exercised by the thermostat E. The air pipe 10, as shown in Fig. 2, leading from the thermostat, is connected with the operating mechanism of the radiator valve 13.

In addition to the unit heating device just described, there may, if desired, be provided additional heating means, such as a direct radiator F, the valve 14 of which may be controlled by the thermostat E in the same manner as described in connection with the radiator D of the unit heating device. It is understood, however, that the matter of the heating means for the room may be of any type which meets the desired requirements.

The outside air dampers 6 may be normally closed and the inside air re-circulated by being drawn into the inlet 2 of the cabinet and discharged from the discharge outlet 4 at the top thereof. Heat is supplied to this re-circulated air by means of the radiators D and F, and the process of re-circulated air is continued until the room temperature rises above the normal temperature at which the thermostat is set. When the room temperature tends to become abnormal for any reason, such as the body heat of the occupants, sun heat, or other uncontrollable factors, the process of temperature regulation takes place by restriction of the heat in the radiators and the introduction of outside air by the opening of the dampers 6. Outside air is admitted through the inlet 5 and discharged into the room through the outlet 4 only for the purpose of lowering the temperature in the room. The relation in which the restriction of the heat in the radiators and the movement of the dampers 6 and 7 are controlled forms no part of my present invention and need not be further described. It is sufficient for the purposes of the present invention, that the steam fed to the radiators is controlled in accordance with the requirements for artificial heat in the room.

The radiator D is of a well-known type of light weight construction, and in general comprises a hollow core 15, Figs. 2 and 3, having a plurality of parallelly disposed thin radiating fins 16 mounted on the core. The air to be heated is circulated between the fins. One end of this core is connected to the valve-controlled steam inlet pipe 11 and the other end to the steam outlet pipe 12, as before described.

In this particular structure the flat, elongated core 15 is positioned substantially horizontally, and a pipe 17 leads from this core to a header 18 positioned adjacent the edges of the fin 16 and in parallel relation thereto. This header has a plurality of small pipes 19 which form nozzles which project in between the fins 16 of the radiator above the radiator core. These nozzles 19, together with the pipe connection 17 and header 18, form leaks or openings through which a portion of the steam in the radiator escapes to the atmosphere to introduce moisture into atmosphere for humidifying purposes. The nozzles are preferably positioned between the fins, so that the steam escaping therefrom will be in the path of the air drawn through the radiator fins by the fan, as before described, and in this way the moisture is quickly distributed throughout the room by the fan.

A hand valve 20 is provided in the pipe 17 leading to the nozzles for regulating the amount of steam delivered to the humidifier nozzles. In the event that the humidifying device is used in connection with a so-called vacuum heating system in which the radiators are alternately under pressure and vacuum condition, it is desirable to include a check valve 21 in the pipe line 17 to the nozzles, to prevent air entering the system through the nozzles when a vacuum exists therein. Thus for a given setting of the valve 20, the amount of steam escaping depends on the steam pressure in the core 15 and this in turn is controlled by the thermostat E. It will thus be seen that the feed of moisture from the pipes 19 is a function of the amount of heat delivered to the room.

Whenever steam is permitted to escape through jets or nozzles like those just described, a certain amount of water due to condensation is necessarily present in the pipes, and in order to prevent this entrained water from dripping upon the floor of the room, I position the nozzle in such manner that the water will drip upon the hot surfaces of the radiator and thereby become evaporated. In the structure shown, the nozzles 19 are positioned above the core 15 of the radiator and are inclined downwardly, as shown in Fig. 3, so that the water will drain outwardly and drip from the ends of the nozzles directly upon the heated surface of said core. If the humidifier is used in connection with the radiator of the direct type F, such as illustrated in the drawings, the nozzles should be so disposed that the water dripping from the nozzles will strike the heated radiator surface in order to be evaporated thereby.

The structure illustrated in the drawings is intended to exemplify one manner of carrying out my invention, but it is to be understood that I do not limit myself thereto and that the invention is capable of modification and re-arrangement without departing from the spirit of the invention, and I contemplate such changes or modifications as are embraced within the scope of the appended claims.

I claim:

1. The combination of a heating radiator including a hollow core having a plurality of radiating fins mounted thereon, a pipe connected to said radiator, a header connected to said pipe, a plurality of nozzles extending from said header between said fins and above said core, and a valve controlling the passage of fluid from the pipe to said header.

2. The combination of a heating radiator including a hollow core having a plurality of radiating fins mounted thereon, a pipe connected to said radiator, a header connected to said pipe, a plurality of nozzles extending from said header between said fins and above said core, and a valve controlling the passage of steam or water from the pipe to the header, said nozzles being inclined downwardly to cause any water dripping from said nozzles to fall upon the radiator to be re-evaporated.

WILFRED SHURTLEFF.